United States Patent [19]

Yanagi et al.

[11] Patent Number: 5,390,050
[45] Date of Patent: Feb. 14, 1995

[54] ECCENTRIC FRESNEL LENS SHEET AND METHOD OF MAKING SAME

[75] Inventors: Haruyuki Yanagi; Nobuo Minoura, both of Yokohama; Katsumi Kurematsu, Kawasaki; Hideaki Mitsutake, Yokohama, all of Japan

[73] Assignee: Canon Kabushiki Kaisha, Tokyo, Japan

[21] Appl. No.: 86,359

[22] Filed: Jul. 6, 1993

Related U.S. Application Data

[63] Continuation of Ser. No. 433,989, Nov. 9, 1989, abandoned.

[30] Foreign Application Priority Data

Nov. 10, 1988 [JP] Japan .................................. 63-284582
Oct. 31, 1989 [JP] Japan .................................. 1-285895

[51] Int. Cl.$^6$ ........................ G02B 3/08; B29D 11/00
[52] U.S. Cl. ........................ 359/742; 359/900; 264/2.5; 425/808
[58] Field of Search ............. 350/452, 168, 322, 117, 350/122, 123, 124, 125, 127, 128, 167, 320; 353/74, 75, 76, 77, 78, 79, 38; 359/615, 900, 443, 448, 454, 460, 741, 742, 743, 457, 459; 264/1.1, 1.7, 1.9

[56] References Cited

U.S. PATENT DOCUMENTS

| | | | |
|---|---|---|---|
| 4,39,027 | 3/1984 | Shioda et al. | 353/77 |
| 2,441,747 | 5/1948 | Beshgetoor | 350/452 |
| 2,510,344 | 6/1950 | Law | 88/28.93 |
| 3,263,079 | 7/1966 | Mertz et al. | 359/565 |
| 3,628,854 | 12/1971 | Jampolsky | 359/742 X |
| 3,848,980 | 11/1974 | Plummer | 352/81 |
| 3,972,593 | 8/1976 | Appledorn et al. | 350/452 |
| 3,982,822 | 9/1976 | Conder et al. | 353/38 X |
| 4,076,384 | 2/1978 | Deml et al. | 350/122 |
| 4,147,408 | 4/1979 | Plummer | 350/128 |
| 4,152,047 | 5/1979 | Inoue | 350/122 |
| 4,173,399 | 11/1979 | Yevick | 353/78 |
| 4,374,609 | 2/1983 | Lange | 350/128 |
| 4,391,495 | 7/1983 | Mazurkewitz | 350/452 |
| 4,458,993 | 7/1984 | Kempf | 353/82 |
| 4,468,092 | 8/1984 | Inoue et al. | 350/128 |
| 4,482,206 | 11/1984 | Van Breemen | 350/128 |
| 4,509,822 | 4/1985 | Clausen et al. | 350/128 |
| 4,512,631 | 4/1985 | VanBreemen | 350/128 |
| 4,525,029 | 6/1985 | Inoue et al. | 350/128 |
| 4,550,977 | 11/1985 | Inoue et al. | 350/128 |
| 4,573,121 | 2/1986 | Saigo et al. | 351/178 X |
| 4,666,248 | 5/1987 | van de Ven | 350/128 |
| 4,674,836 | 6/1987 | Yata et al. | 350/128 |
| 4,701,020 | 10/1987 | Bradley, Jr. | 350/128 |
| 4,708,435 | 11/1987 | Yata et al. | 350/129 |
| 4,721,361 | 1/1988 | van de Ven | 350/128 |
| 4,725,134 | 2/1988 | Ogino | 353/74 |
| 4,919,518 | 4/1990 | Ogino et al. | 350/128 |

FOREIGN PATENT DOCUMENTS

| | | | |
|---|---|---|---|
| 1487841 | 5/1967 | France . | |
| 60-61738 | 4/1985 | Japan . | |
| 692569 | 6/1953 | United Kingdom | 350/452 |

*Primary Examiner*—William L. Sikes
*Assistant Examiner*—David R. Parsons
*Attorney, Agent, or Firm*—Fitzpatrick, Cella, Harper & Scinto

[57] ABSTRACT

An eccentric Fresnel lens is formed from a concentric Fresnel lens sheet or Fresnel lens sheet mold. The concentric Fresnel lens sheet or mold is cut to produce an eccentric Fresnel lens having a center offset from the optical axis of the concentric Fresnel lens.

5 Claims, 5 Drawing Sheets

ECCENTRIC FRESNEL LENS SHEET AND METHOD OF MAKING SAME

This application is a continuation of application Ser. No. 07/433,989, filed Nov. 9, 1989, now abandoned.

BACKGROUND OF THE INVENTION

1. Field of the Invention

The present invention relates to a screen, a display device using the screen, and a method of forming the screen and, more particularly, to a back projection type screen, a method of forming the back projection type screen, and back projection type image display device using the back projection type screen.

2. Related Background Art

There is available a conventional back type projection image display device having a schematic arrangement shown in FIG. 1. This arrangement employs an oblique incident type in which an incident angle $\theta_0$ of image light of a central portion is not 0°. There is also known a back projection type image display device of a vertical incident type in which the incident angle $\theta_0$ is 0°.

Referring to FIG. 1, a projection lens 2 enlarges and projects image light from a CRT 3 onto a screen 1 through mirrors 4a and 4b. The projection lens 2, the CRT 3, and the mirrors 4a and 4b are housed in a cabinet 5.

In the image display device having the above arrangement, the screen 1 comprises a Fresnel lens sheet having a focusing function, a diffusion board mixed with a diffusion agent, or vertical lenticular lens sheet (lenticular lenses vertically extend) for controlling the viewing characteristics in the right-and-left direction of the screen.

When the incident angle $\theta_0$ is not zero, i.e., when light is obliquely incident, it has been known that a Fresnel lens is manufactured such that the concentric center of a concentric prism portion formed on a sheet is located outside the sheet (this Fresnel lens is referred to as an eccentric Fresnel lens hereinafter).

In order to manufacture this prior eccentric Fresnel lens, one specific mold for the eccentric Fresnel lens must be usually prepared and manufactured in e.g., compression forming. It is difficult to manufacture different eccentric Fresnel lens molds asymmetrical in the eccentric direction due to their eccentricity as compared with the manufacture of a concentric mold.

SUMMARY OF THE INVENTION

The present invention has been made in consideration of the above drawbacks of the conventional examples and provides as its first object, a method of forming a screen having eccentric Fresnel lenses, in which the manufacturing process can be simplified and the manufacturing cost is low.

It is a second object of the present invention to provide a screen, a display device using the screen, and a method of manufacturing the display device, wherein the manufacturing process can be simplified and the manufacturing cost is low when a screen whose refractive index (power) is distributed by using two Fresnel lens sheets in order to prevent an increase in light transmission loss of the Fresnel lens sheets when an incident angle $\theta_0$ is increased.

The above and other objects, features, and advantages of the present invention will be apparent from the detailed description of a preferred embodiment in conjunction with the accompanying drawings.

DESCRIPTION OF THE PREFERRED EMBODIMENTS

Figure 2:
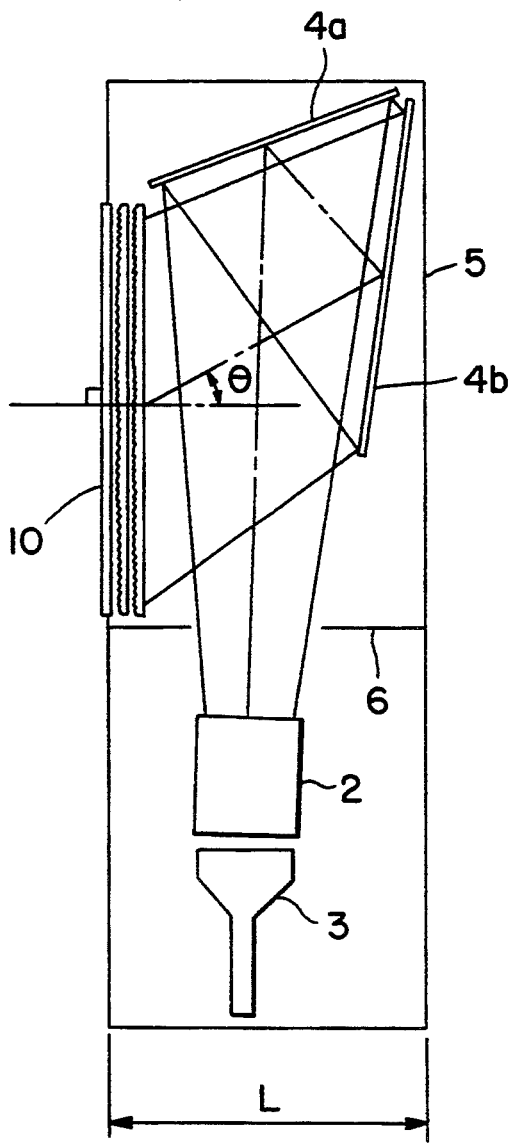
FIG. 2 is a schematic view of an oblique incident type image display device.

FIG. 2 shows a schematic arrangement of an oblique incident type image display device.

Figure 1:
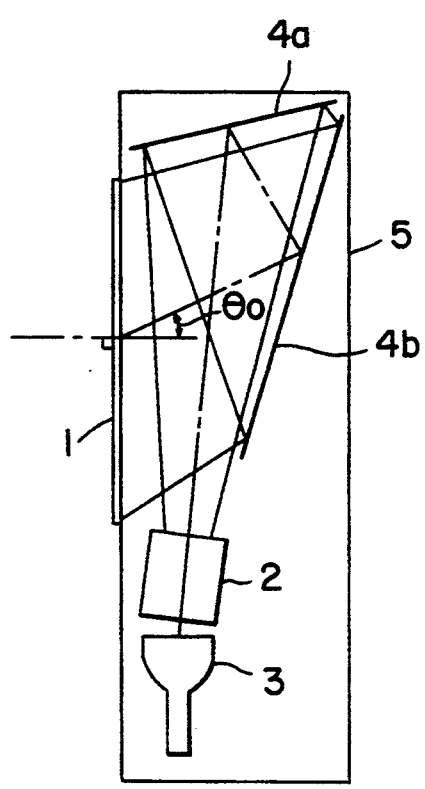
FIG. 1 is a schematic view of a conventional back projection type image display device.

The same reference numerals as in FIG. 1 denote the same parts in FIG. 2. The image display device in FIG. 2 also includes a light-shielding plate 6, and a screen 10.

An oblique incident type image display device generally has a smaller depth L than that of a vertical incident image display device. However, the oblique incident type image display device has a disadvantage in that image light emerging from the screen 10 is directed downward to decrease brightness at an observation point, and that an incident angle of an incident light beam at a peripheral portion (especially the lower part in FIG. 2) of the screen is increased to cause a reflection loss and light beam eclipse on the Fresnel lens surface. For these reasons, a plurality of eccentric Fresnel lens sheets are arranged in the screen 10 to output the image light in the horizontal direction and achieve natural deflection (by power dispersion by the plurality of Fresnel lens sheets) of light beams incident at large incident angles.

Figure 3:
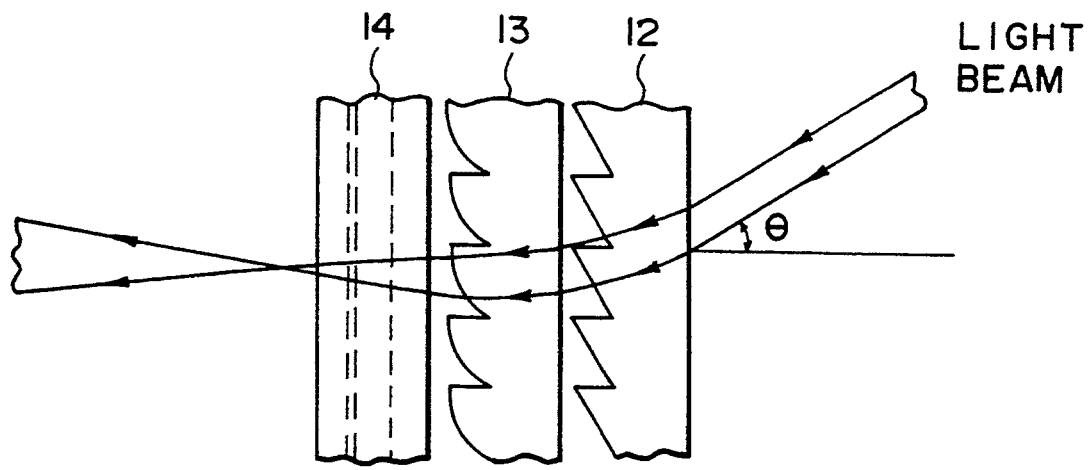
FIG. 3 is a side view of the screen shown in FIG. 2.
Figure 4:
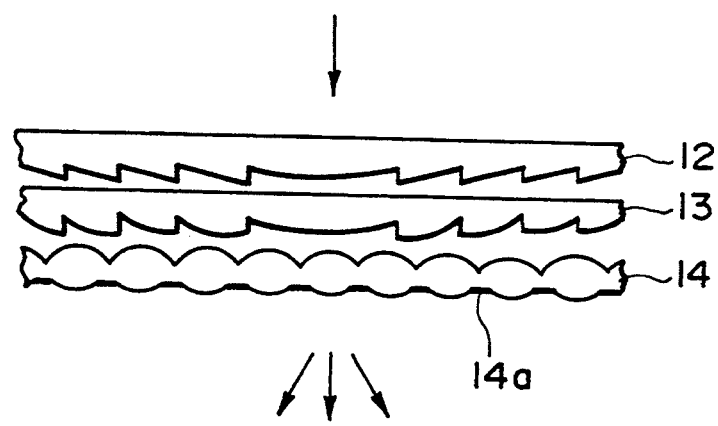
FIG. 4 is a plan view of the screen shown in FIG. 2.

FIGS. 3 and 4 are a side view and a plan view, respectively, of the arrangement of the screen 10. The screen 10 has a multilayered structure consisting of an eccentric Fresnel lens sheet 12, a curvature prism eccentric Fresnel lens sheet 13, and a double lenticular lens sheet 14, which are stacked from the light incident side. In the Fresnel lens sheet 12, the center of curved or arcuated prism surface groups constituting the Fresnel lens is deviated from the center of the screen 10. The prism surface groups of the Fresnel lens sheet 13 have curvatures. The Fresnel lens sheets 12 and 13 have flat surface on the light incident side and Fresnel lenses on the light emerging side. Therefore, the light beams having large incident angles can be deflected in the horizontal direction with a minimum loss.

Since the prism surface of the eccentric Fresnel lens sheet 13 have the curvatures, the incident light beams are vertically spread by their lens effect thereby increasing the vertical angle of field and hence improving the characteristics of visual field in the vertical direction. However, if the same treatment at the lens sheet 13 is performed on the Fresnel lens sheet 12 located on the extreme light incident side, an image may be blurred. Therefore, formation of the curvature on each prism surface is preferably limited to the Fresnel lens sheet 13 located at the extreme light emerging side.

The right-and-left angle of field is increased by the double lenticular lens sheet 14 having black stripes 14a to prevent a color shift (the color shift may occur when image light beams are projected from R, G, and B CRTs onto the screen 10 at different incident angles) and intervention of external light. Therefore, a good image having good characteristics of visual field in the horizontal direction can be obtained.

Figure 5:
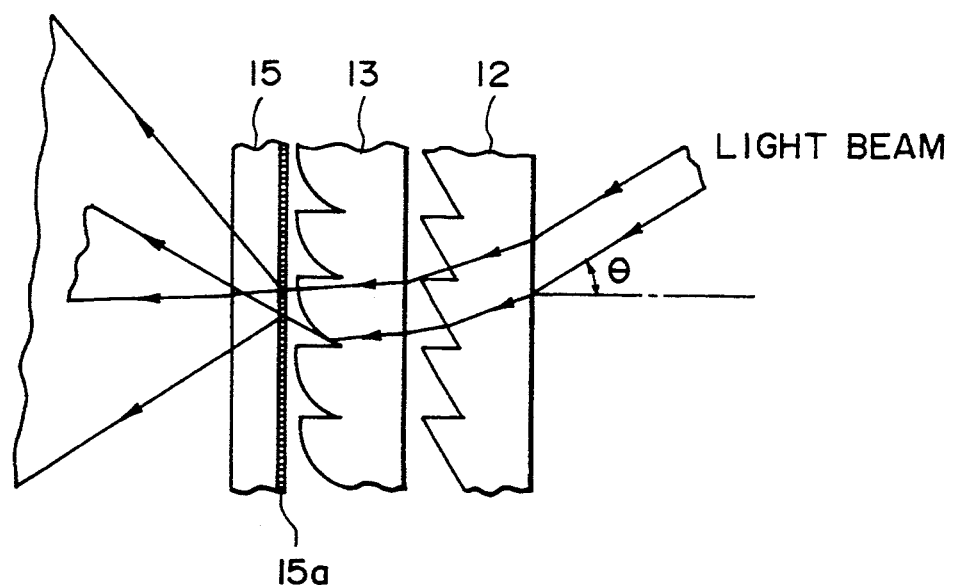
FIG. 5 is a view showing another example of a screen.

FIG. 5 shows another example of the screen 10. In this example, a diffusion plate 15 having a diffusion layer 15a is used in place of the lenticular lens sheet 14. The emerging light beam is largely spread by a diffusion effect of the diffusion layer 15a of the diffusion plate 15 in all directions, thereby further improving the vertical characteristics of visual angle.

Figure 6:
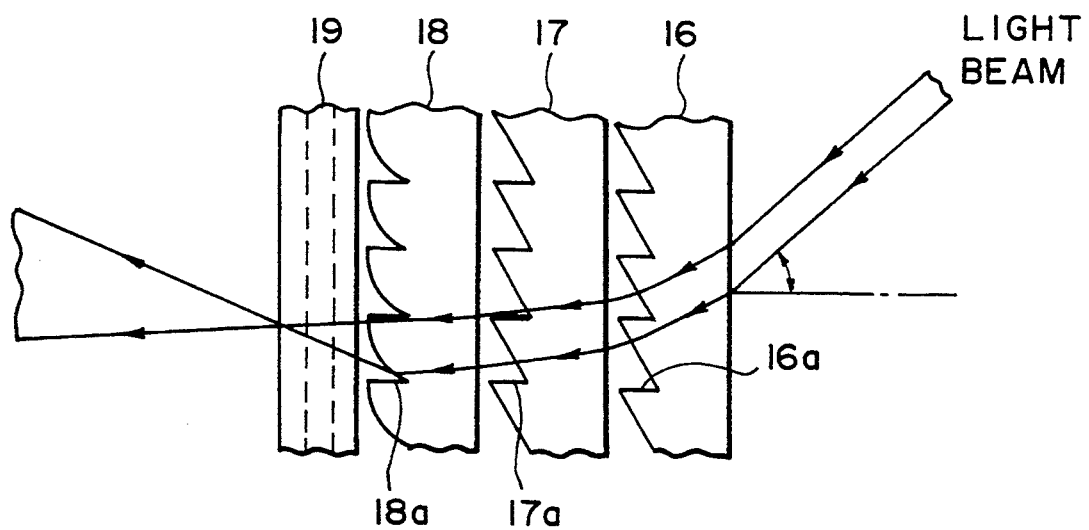
FIG. 6 is a schematic view of a display device according to an embodiment of the present invention.

FIG. 6 is a schematic view showing a screen 10 for a display device according to an embodiment of the present invention. In this embodiment, the screen has two eccentric Fresnel lens sheets 16 and 17, a curvature prism eccentric Fresnel lens sheet 18, and a double lenticular lens sheet 19 in the order named from the light incident side. Since the three eccentric Fresnel lens sheets are stacked on each other, oblique light incident at a larger incident angle can be smoothly and gradually deflected. In this case, the curvature prism surface groups are preferably formed on only the sheet 18 located on the extreme light emerging side. Other arrangements of the screen 10 in FIG. 6 are the same as those of FIG. 2. In addition, the double lenticular lens sheet 19 may be replaced with a diffusion plate as in FIG. 5.

When a plurality of Fresnel lens surfaces are arranged, a moire phenomenon unique to a plurality of cyclic structure occurs due to light beam eclipse or the like in non-lens portions (16a in FIG. 6) which do not contribute to diffraction. However, this drawback can be prevented if the non-lens portions of the plurality of Fresnel lens portions except for the one located on the extreme light incident side are almost parallel to the incident light propagation direction within the sheet or at the sheet emerging portion. For example, if two Fresnel lens sheets are used, these sheets have the same shape due to the following reason. If the non-lens portion of the light emerging Fresnel lens is set to be almost parallel to the incident light propagation direction, eclipse does not occur at the light emerging Fresnel non-lens portion even if eclipse occurs at the light incident Fresnel non-lens portion and the light beam incident on the light emerging Fresnel lens has a fine cyclic fringe structure. The light emerging amounts of the respective portions are theoretically constant regardless of different overlapping states of light beams, thereby preventing a moire pattern. Therefore, the moire pattern is not formed regardless of the shapes of the light incident Fresnel lenses. No consideration is taken for the shape of the non-lens portion.

The eccentric Fresnel lens sheets 16 and 17 in the embodiment of FIG. 6 can have the same shape. In this case, the non-lens portions of the sheets 17 and 18 are almost parallel to the incident light.

The eccentric Fresnel lens sheets 16 and 17 having the same shape can be manufactured by the following method.

Figure 7:
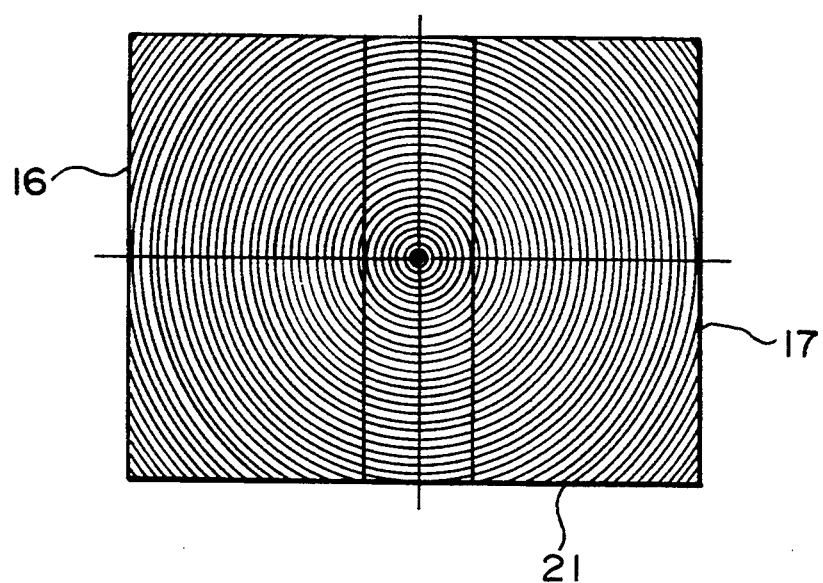
FIGS. 7 to 10 are views for explaining methods of manufacturing eccentric Fresnel lens sheets according to other embodiments of the present invention.

A concentric Fresnel lens 21 is manufactured by a compression forming method or an injection forming method using a press machine and molds, as shown in FIG. 7. In the concentric Fresnel lens sheet 21, the center of the Fresnel lenses is aligned with the center of the sheet. The sheet 21 is cut by a cutter, as shown in FIG. 7, thereby preparing two eccentric Fresnel lens sheets 16 and 17.

Figure 8:
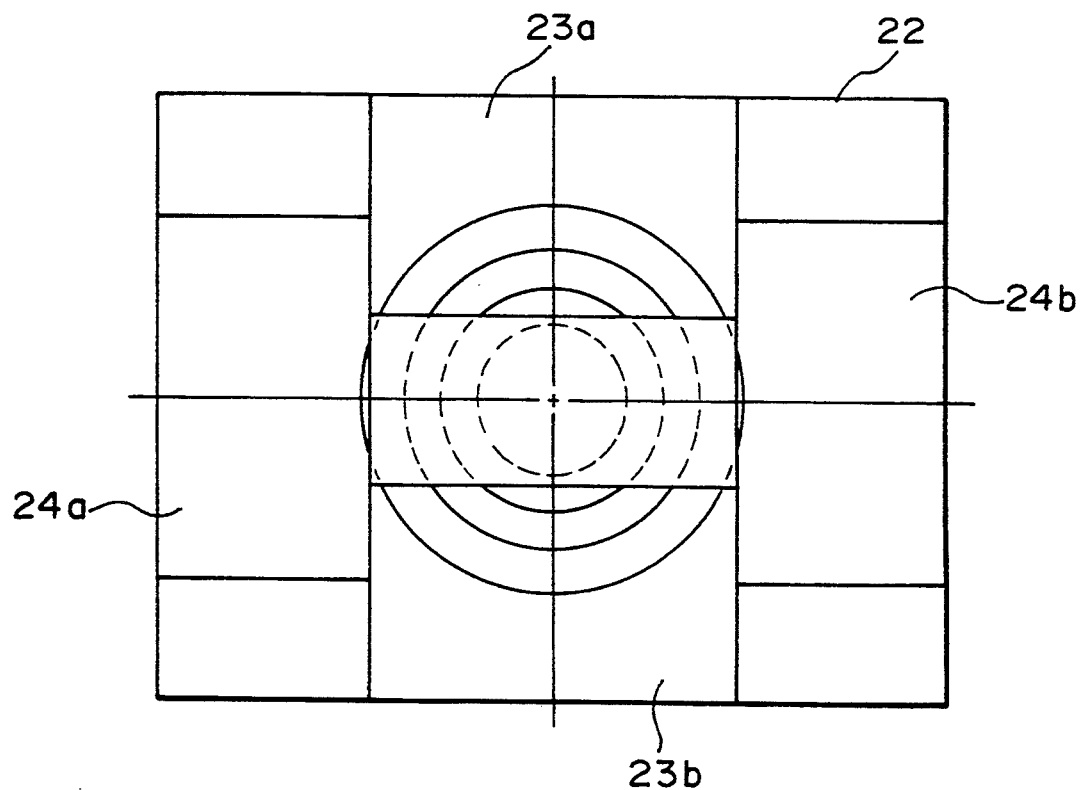

As shown in FIG. 8, a pair of eccentric Fresnel lens sheets 23a and 23b having the same shape and a pair of eccentric Fresnel lens sheets 24a and 24b also having the same shape can be obtained from one concentric Fresnel lens sheet 22.

The manufacturing cost can be greatly reduced by the above method.

Figure 9:
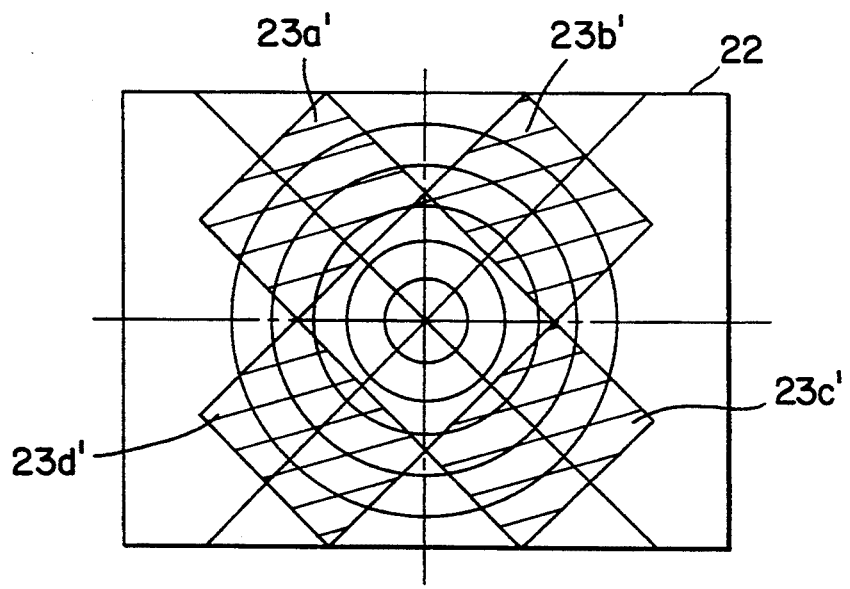
Figure 10:
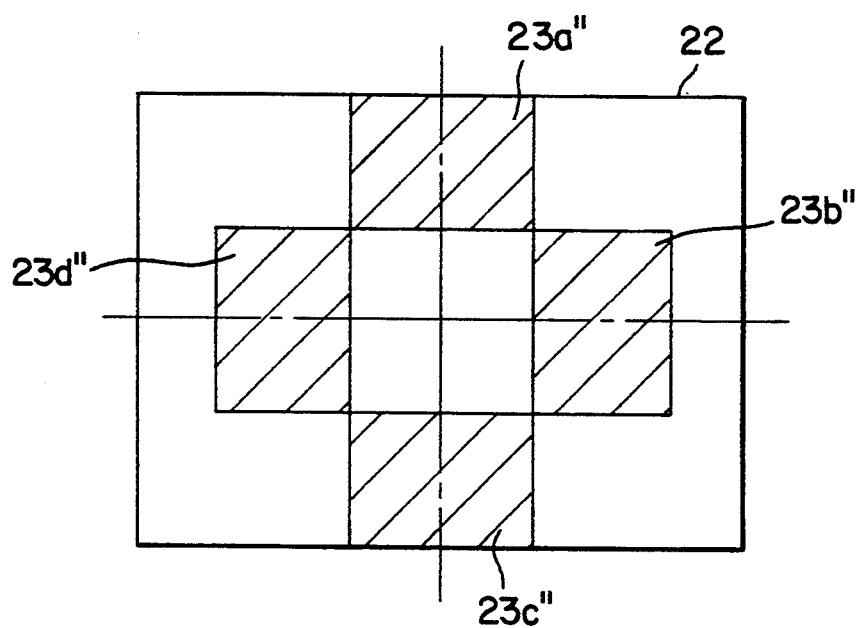

As shown in FIG. 9 or 10, it is possible to obtain four eccentric Fresnel lens sheets 23a', 23b', 23c' and 23d' having the same shape, or 23a'', 23b'', 23c'', and 23d'' having the same shape from one concentric Fresnel lens sheet 22. In this case, the central portion has a square shape. The square central portion is then formed to have a polygonal shape having a larger number of sides, and rectangular eccentric Fresnel lens sheets are then obtained from the polygonal sheet.

In the above embodiment, a plurality of eccentric Fresnel lenses are obtained by cutting one concentric Fresnel lens sheets manufactured by a compression forming method or an injection forming method using the concentric mold. A plurality of identical Fresnel lens mold portions can be obtained by cutting one concentric mold used for manufacturing the concentric Fresnel lens sheet by a compression forming method or an injection forming method and the eccentric Fresnel lens sheets may be manufactured by the compression forming method or the injection forming method. In this case, one concentric Fresnel lens sheet in FIGS. 7 to 10 is replaced with the concentric mold, and portions corresponding to the eccentric Fresnel lens mold portions can be obtained.

We claim:

1. A method of manufacturing an eccentric Fresnel lens sheet, comprising the steps of:
   forming a rectangularly shaped concentric Fresnel lens sheet having an optical axis; and
   cutting the concentric Fresnel lens sheet to produce a plurality of eccentric Fresnel lens sheets, each of which does not include the optical axis.

2. A method of manufacturing an eccentric Fresnel lens sheet, comprising the steps of:
   forming a mold for a concentric Fresnel lens having an optical axis;
   cutting the mold for the concentric Fresnel lens to produce a mold for an eccentric Fresnel lens which is offset from the optical axis; and
   molding an eccentric Fresnel lens sheet by using the mold for eccentric Fresnel lens.

3. A method of manufacturing an eccentric Fresnel lens sheet which deflects a light beam obliquely incident on a surface of said lens sheet and causes the light beam to exit said lens sheet in a direction substantially normal to said lens sheet surface, comprising the steps of:
   forming a rectangularly shaped concentric Fresnel lens sheet having an optical axis; and
   cutting the concentric Fresnel lens sheet to produce a plurality of eccentric Fresnel lens sheets, each of which does not include the optical axis.

4. A method of manufacturing an eccentric Fresnel lens sheet, comprising the steps of:
   forming a mold for a concentric Fresnel lens having an optical axis;
   cutting the mold for the concentric Fresnel lens to produce a plurality of molds for eccentric Fresnel lens which is offset from the optical axis; and producing an eccentric Fresnel lens sheet by using each of the molds for eccentric Fresnel lens.

5. A method of manufacturing an eccentric Fresnel lens sheet, comprising the steps of:

forming a concentric Fresnel lens sheet having an optical axis; and cutting the concentric Fresnel lens sheet to produce a plurality of eccentric Fresnel lens sheets, each of which does not include the optical axis.

* * * * *

UNITED STATES PATENT AND TRADEMARK OFFICE
CERTIFICATE OF CORRECTION

PATENT NO. : 5,390,050
DATED : February 14, 1995
INVENTOR(S) : Yanagi et al.

It is certified that error appears in the above-indentified patent and that said Letters Patent is hereby corrected as shown below:

On the Title page, item [56] References Cited:

U.S. PATENT DOCUMENTS, 4,39,027 3/1984 Shioda et al." should read --4,439,027 3/1984 Shioda et al.--.

COLUMN 2:

Line 53, "surface" should read --surfaces--.
Line 58, "surface" should read --surfaces--.

COLUMN 3:

Line 34, "structure" should read --structures--.

COLUMN 4:

Line 22, "sheets" should read --sheet-.

Signed and Sealed this

Fourth Day of July, 1995

Attest:

BRUCE LEHMAN

Attesting Officer    Commissioner of Patents and Trademarks